July 24, 1956          F. W. RAUTER          2,755,510
METHOD OF MAKING PROFILING MACHINE MODELS
Filed Feb. 28, 1951          2 Sheets-Sheet 1
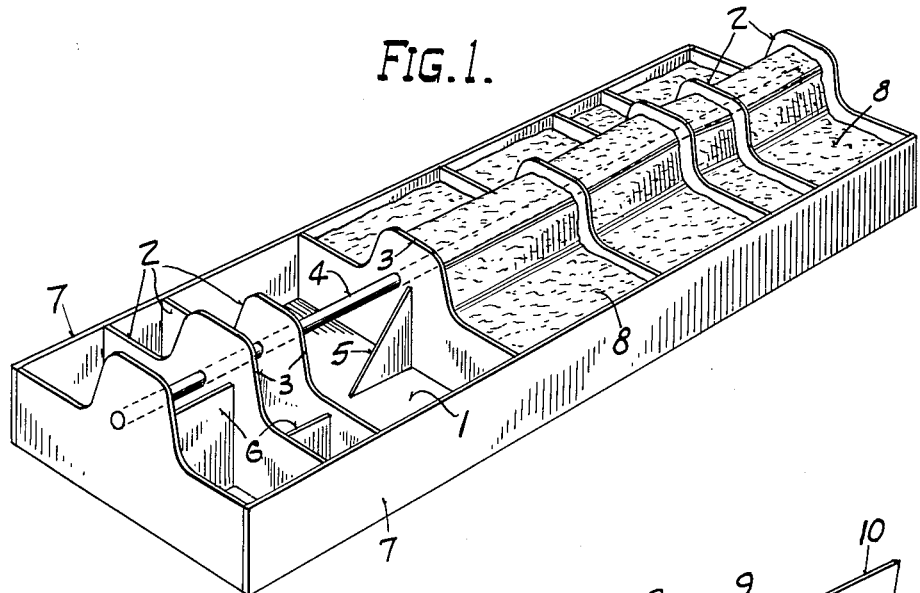
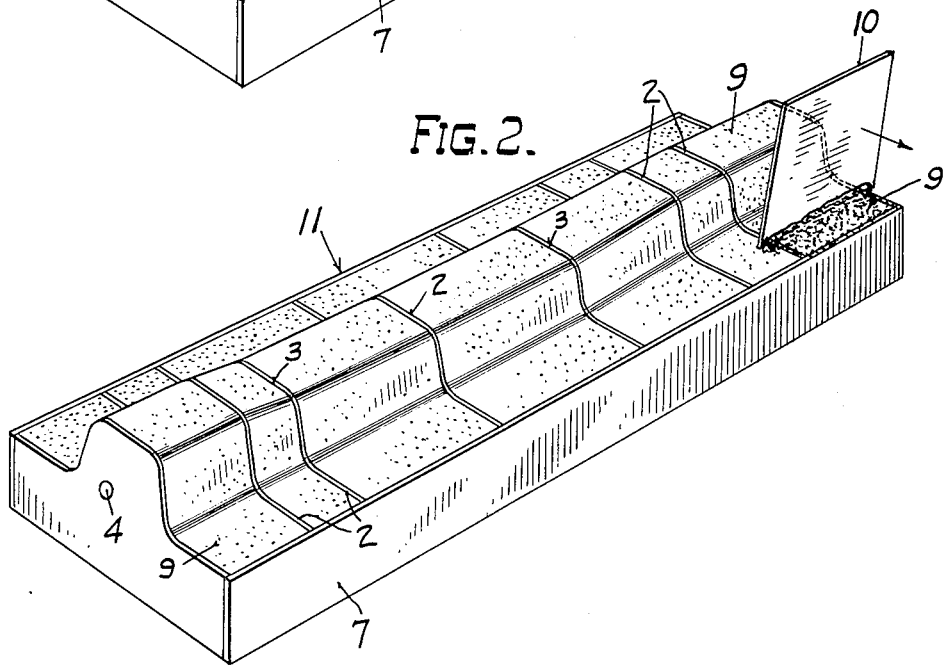
*INVENTOR.*
*Frederick W. Rauter*
BY
*Andrus & Sceales*
ATTORNEYS.

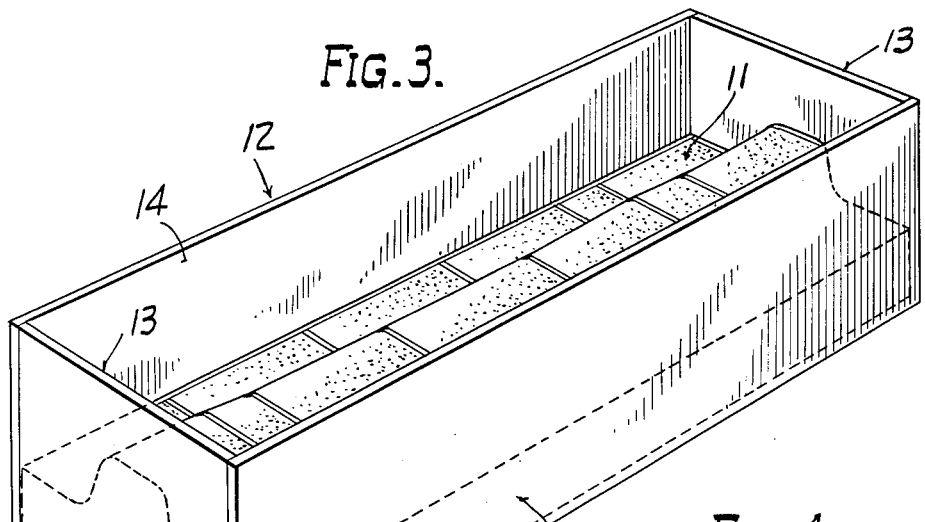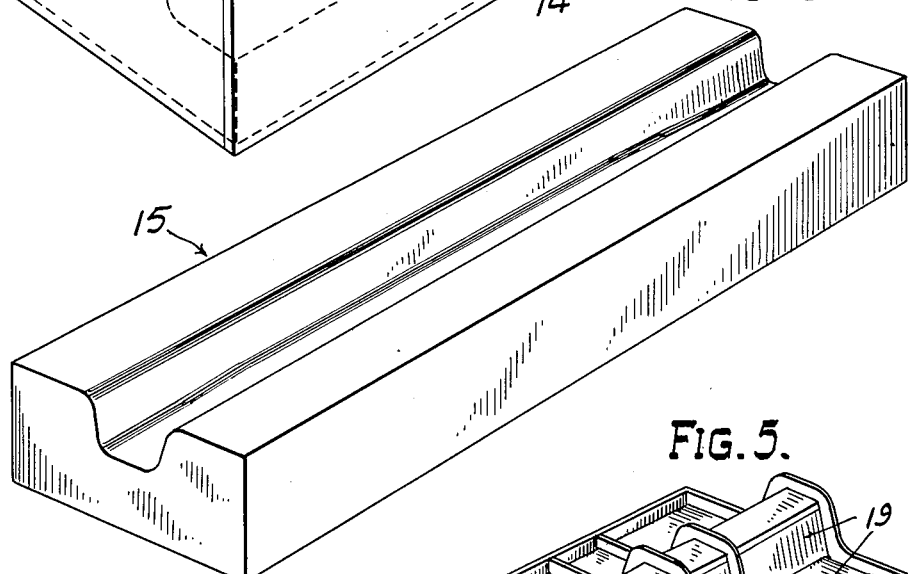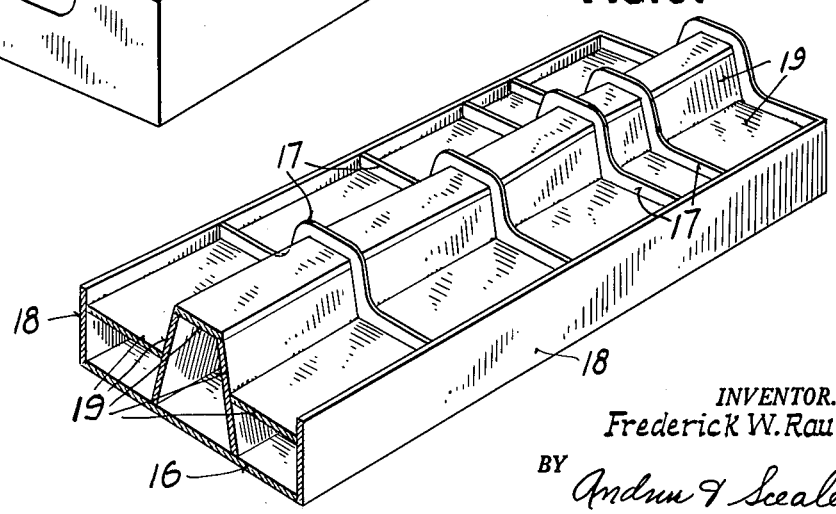

United States Patent Office

2,755,510
Patented July 24, 1956

2,755,510

METHOD OF MAKING PROFILING MACHINE MODELS

Frederick W. Rauter, Milwaukee, Wis., assignor to A. O. Smith Corporation, Milwaukee, Wis., a corporation of New York Application February 28, 1951, Serial No. 213,227

2 Claims. (Cl. 18—47.5)

This invention relates to profiling machine models and more particularly, to a new and improved method of making the same.

An object of the present invention is to provide a more economical and less time consuming method of constructing profiling machine models.

Another object of the invention is to provide a method of constructing profiling machine models which requires a minimum of skilled hand-working.

Still another object is to provide a model which will not warp and is relatively unaffected by temperature gradients.

Another object is to provide an extremely smooth-surfaced model which is cast from a pattern.

Another object of the invention is to provide a pattern for making profiling machine models which has a highly accurate contour surface and is of simple construction.

Another object is to provide a pattern parts of which may be utilized to check the accuracy of the dimensions of the finished model from which the die is made.

A profiling, or Kellering machine as it is known in the trade, is employed to produce a contoured die from a metal work piece. In such a machine it is customary to mount a profiling model, generally referred to as a Keller model, on the machine in such a position that the guiding spindle may be moved over the surface of the model and this movement is translated to, and controls, the operation of a cutter which cuts an article from the work piece geometrically similar to that of the Keller model.

Heretofore Keller models were ordinarily made of laminated mahogany by skilled artisans. Small strips of mahogany were hand worked to obtain the desired profile or contour, and the numerous strips were then joined or laminated to form the finished pattern. However, this method of making a model is extremely costly and time consuming due to the large amount of precision hand work.

By the present invention a highly accurate and smooth-surfaced Keller model may be produced in approximately one-fourth of the time and with one-fourth of the cost as compared to those constructed of wood. This is accomplished by casting said model from a clay-surfaced pattern.

The pattern consists of a number of axially spaced templates, the upper edges of which are shaped in conformity to a series of contours of the model to be produced, the templates being mounted and so arranged that the contour edges of the templates have the same relation to each other as that between the corresponding contours of the model to be cast. A suitable self-hardening plastic material is disposed in the spaces between templates or a skeleton of plastic plates is built up to a slight distance below the contour edges of the spaced templates. The spaces between templates on top of either the self-hardening plastic material or plastic plates are filled with modeling clay, with excess clay projecting above the contour edges of the templates. This excess clay is swept off with a scraper, the scraper riding on the upper edges of the templates, and scraping the clay away to level the upper surface of the clay down to the level of the upper edges of the templates. The resulting pattern may be considered as a male pattern.

This clay-contoured male pattern is next enclosed in a suitable frame to form a mold which has a depth at least twice the thickness of the pattern. The mold is then filled with a self-hardening plastic material which is laid over the contoured surface of the male pattern. After setting, the frame and male pattern are removed and the resulting female casting comprises the Keller model from which the desired metal die is contoured. The clay male pattern may be dismantled and the templates employed to check the contour accuracy of the finished cast or Keller model.

Other objects of the invention will appear from the following description of an embodiment of the invention illustrated by the accompanying drawings.

In the drawings:

Figure 1 is a perspective view of an embodiment of the invention showing the pattern structure partially filled with plastic material;

Fig. 2 is a perspective view of the invention illustrating the addition of clay to the pattern structure and the scraping operation;

Fig. 3 is a view in perspective showing the mold for casting the Keller model;

Fig. 4 is a perspective view of the finished Keller model; and

Fig. 5 is a perspective view of another embodiment of the invention illustrating the plastic frame method of constructing the pattern, an end being broken away.

Referring to the drawings, in Fig. 1 there is illustrated an embodiment containing the present invention, comprising a generally rectangular base plate 1 on which is transversely mounted on their lower edges a series of laterally spaced templates 2. The templates may be constructed of plastic or metal or any other material which can be machined and which possesses a substantially firm edge. The templates 2 are approximately the same width as the base plate 1 and the lower edge of each template is suitably secured to plate 1 with the templates disposed in spaced relation of each other.

The upper or contour edge 3 of each template 2 is shaped in conformity to one of a series of contours of the model to the cast therefrom.

The templates 2 are so spaced on the base plate 1 that the contours 3 of the templates have the same relation to each other as that between the corresponding contours of the model to be cast.

The contours of the templates may be kept in the proper alignment by inserting a rod 4 through an aligned hole in each of the spaced templates.

Added support is given to the templates by a plurality of generally triangular shaped bracing plates 5, the edges of which are secured to base plate 1 and to a respective template 2. If the templates, positioned at predetermined station lines, are in close proximity a generally rectangular plate 6 may be attached edgewise to the base and the adjacent templates to give added support thereto. The contour edge 3 of each template is of course upwardly removed from plates 5 and 6.

A side plate 7 for each side of the pattern structure is attached to the side edges of each template 2 and to the longitudinal edges of base plate 1. Side plate 7 extends to a height corresponding to that of the outer end of the contour edge 3 of each template. The joining of side plates 7 to the end templates 2 and the base 1 gives the structure a box-like appearance.

The area between the templates 2 and the side plates 7 is then filled to a slight distance below the contour edges 3 with a self-hardening plastic material 8. This material may be plaster of Paris, or any similar substance which will harden rather quickly and present a hard, strong surface.

The spaces between the templates 2 and the side plates 7 above material 8 are filled with modeling clay 9. The modeling clay 9 is preferably stamped down by hand or otherwise compressed to eliminate any voids in the clay and thus present a relatively unyielding body of material. Clay 9, as filled in by the workman, slightly covers the contour edges 3 of the templates. This excess clay is struck off with a straight-edged scraper 10 as shown in Fig. 2 where a small portion of excess clay remains to be scraped off. Scraper 10 preferably spans only two adjacent templates and rides along the contour edges 3 of these templates to form the desired shape determined by said edges.

The completed pattern 11 of Fig. 2 is next enclosed in a suitable mold 12 as shown in Fig. 3, comprising end walls 13 and side walls 14 which extend a substantial distance above the contour upper surface of pattern 11. The space bounded by walls 13 and 14 above pattern 11 is filled, not shown, with a self hardening plastic material, similar to that employed in making the clay-surfaced pattern.

After setting the hardened cast model 15, as shown in Fig. 4, is removed from mold 12. The mold and pattern may then be dismantled and templates 2 used to check the accuracy of the contoured surface of the cast model 15.

Cast model 15 is then employed as a Keller model in a profiling machine, not shown, from which a duplicate, geometrically similar metal die is produced.

Fig. 5 illustrates another embodiment of the invention, comprising a generally rectangular base plate 16 on which is mounted a series of spaced templates 17. The templates are constructed and arranged on the base plate in a manner similar to that previously described.

As in the prior embodiment a side wall plate 18 is attached to the side edges of the spaced templates 17 and to the longitudinal edges of the base plate 16 to form a box like structure.

A plurality of filler plates 19 extend between each pair of templates 17 and the end edges of plates 19 are attached to the templates at a slight distance, roughly about one-fourth of an inch, below the contour edge of each template. Plates 19 completely enclose the cavities bordered by templates 17, side plates 18 and base plate 16 and function similar to the plastic material 8 of Fig. 1.

In a manner similar to that previously described with respect to the first embodiment the spaces above plates 19 are filled with clay, not shown, to form a clay-surfaced pattern which in turn is scraped down to the template contoured edges and then utilized to cast the finished plastic or Keller model as previously described.

The invention contempaltes not only the use of plastic self-hardening material or plastic plates as a base for the modeling clay in the construction of the pattern, but any other suitable substance which may be employed in a similar capacity to give the pattern strength and rigidity and also to serve as a firm base for the clay. The use of modeling clay or any similar slow-hardening plastic material provides a very workable pattern surface which may be easily conformed to the desired contours without the danger of pre-hardening.

In practice it has been found that the clay must be maintained at a minimum thickness and that one-quarter to one-half inch of thickness gives the best results. If greater thicknesses of clay are employed it is a difficult job to stamp the clay tightly so that there will be no voids. Where voids are present inaccuracies in dimensions are developed when the model is cast from the pattern as the material of the model is heavier than that of the pattern and would tend to depress those portions of the clay which had not been thoroughly stamped. A thin cover layer of clay is readily compressed into a relatively unyielding body of material.

The pattern is formed to dimension by a simple scraping operation and no machining is required. The pattern from which the Keller model is cast is not only of simple and inexpensive construction, but also possesses a hard and accurate contour surface from which an accurate model may be cast.

Various embodiments of the invention may be employed within the scope of the following claims.

I claim:

1. The method of making a profiling machine model which comprises the formation of a pattern by providing the upper edges of a series of dismantlable templates with the reverse contour of the model with said templates disposed in spaced relation in the order of the contour desired in the pattern formed therefrom, overfilling the spaces between said templates with material the upper surface of which is relatively pliable, removing the surface of said material to the plane of the upper edges of the templates with the pliable material having a depth of one-quarter to one-half inch measured from the upper edges of said templates to form the completed pattern over which the desired model of opposite contour is to be molded, placing the pattern in a mold, filling the mold with a self-hardening material to form a model, removing the model after the self-hardening material has set, dismantling the mold and pattern, and checking the contoured surface of the model with the templates of the pattern to insure that an accurate profiling machine model has been produced.

2. The method of making a profiling machine model which comprises the steps of the formation of a pattern by providing the upper edges of a series of dismantlable templates with the reverse contour of the model to be reproduced, disposing said templates in spaced relation in the order of the contour desired in the pattern formed therefrom, reducing the space between the templates to approximately one-half inch from the upper edges by securing plate members in the spaces between the templates, overfilling the spaces above said plate members and said templates with a pliable material, scraping the pliable material down to the upper edges of the templates to form a pattern on which the model of opposite contour is molded, the edges of the templates serving as guides to accomplish said scraping operation, placing the pattern in a mold, filling the mold with a hardening material which forms the model, removing the model after the material has hardened, dismantling the pattern, and checking the contoured surface of the model with the templates of the pattern to insure that an accurate profiling machine model has been produced.

References Cited in the file of this patent

UNITED STATES PATENTS

| 1,937,993 | Stees | Dec. 5, 1933 |
| 2,202,683 | Baesgen | May 28, 1940 |
| 2,434,372 | Stewart | Jan. 13, 1948 |
| 2,460,242 | Renaud | Jan. 25, 1949 |
| 2,480,048 | Rice | Aug. 20, 1949 |
| 2,575,865 | Dazeley | Nov. 20, 1951 |